US012715593B2

(12) United States Patent
Hart et al.

(10) Patent No.: US 12,715,593 B2
(45) Date of Patent: Aug. 25, 2026

(54) AERONAUTICAL PROPULSION SYSTEM

(71) Applicant: Evolito LTD, Bicester (GB)

(72) Inventors: Simon Hart, Oxfordshire (GB); Mukesh Patel, Oxfordshire (GB); Chris Burns, Oxfordshire (GB)

(73) Assignee: Evolito LTD, Bicester (GB)

( * ) Notice: Subject to any disclaimer, the term of this patent is extended or adjusted under 35 U.S.C. 154(b) by 0 days.

(21) Appl. No.: 18/991,312

(22) Filed: Dec. 20, 2024

(65) Prior Publication Data

US 2025/0206450 A1 Jun. 26, 2025

(30) Foreign Application Priority Data

Dec. 22, 2023 (GB) ..................................... 2319962

(51) Int. Cl.

| | |
|---|---|
| ***B64D 27/34*** | (2024.01) |
| ***B64D 35/021*** | (2024.01) |
| *B64C 29/00* | (2006.01) |
| *B64F 5/10* | (2017.01) |

(52) U.S. Cl.

CPC ........... *B64D 27/34* (2024.01); *B64D 35/021* (2024.01); *B64C 29/00* (2013.01); *B64F 5/10* (2017.01)

(58) Field of Classification Search

CPC ...... B64D 27/34; B64D 27/24; B64D 35/021; B64U 50/19

See application file for complete search history.

(56) References Cited

U.S. PATENT DOCUMENTS

| | | | |
|---|---|---|---|
| 5,361,650 | A | 11/1994 | Klecker et al. |
| 5,662,007 | A | 9/1997 | Starker et al. |
| 6,530,856 | B1 | 3/2003 | Kakiage |
| 11,267,574 | B2 | 3/2022 | Benson et al. |
| 11,560,235 | B2 | 1/2023 | Wagner et al. |
| 2006/0064998 | A1 | 3/2006 | Funahashi et al. |
| 2010/0147105 | A1 | 6/2010 | Schoen |

(Continued)

FOREIGN PATENT DOCUMENTS

| | | | |
|---|---|---|---|
| DE | 102004048908 | A1 | 4/2006 |
| DE | 102006005095 | A1 | 8/2007 |

(Continued)

OTHER PUBLICATIONS

United Kingdom Intellectual Property Office Combined Search and Examination Report for Application No. 2319962.3 dated Jun. 24, 2024 (6 pages).

(Continued)

*Primary Examiner* — Justin Michael Heston

(74) *Attorney, Agent, or Firm* — Michael Best & Friedrich LLP

(57) ABSTRACT

An aeronautical propulsion system (200), comprises a propeller (202) mounted to a propeller shaft (204) defining a propeller axis (214); an electric motor (208) comprising a motor output shaft defining a motor axis (216); wherein the motor output shaft and propeller shaft are connected by a linkage such that, in use, driving the motor output shaft for rotation drives rotation of the propeller via the propeller shaft and linkage; and a motor power unit configured to receive power from a power source and provide a motor drive signal to the motor; wherein the motor power unit is spaced along the motor axis from the motor.

7 Claims, 2 Drawing Sheets

(56) References Cited

U.S. PATENT DOCUMENTS

Figure 1:
Figure 1:
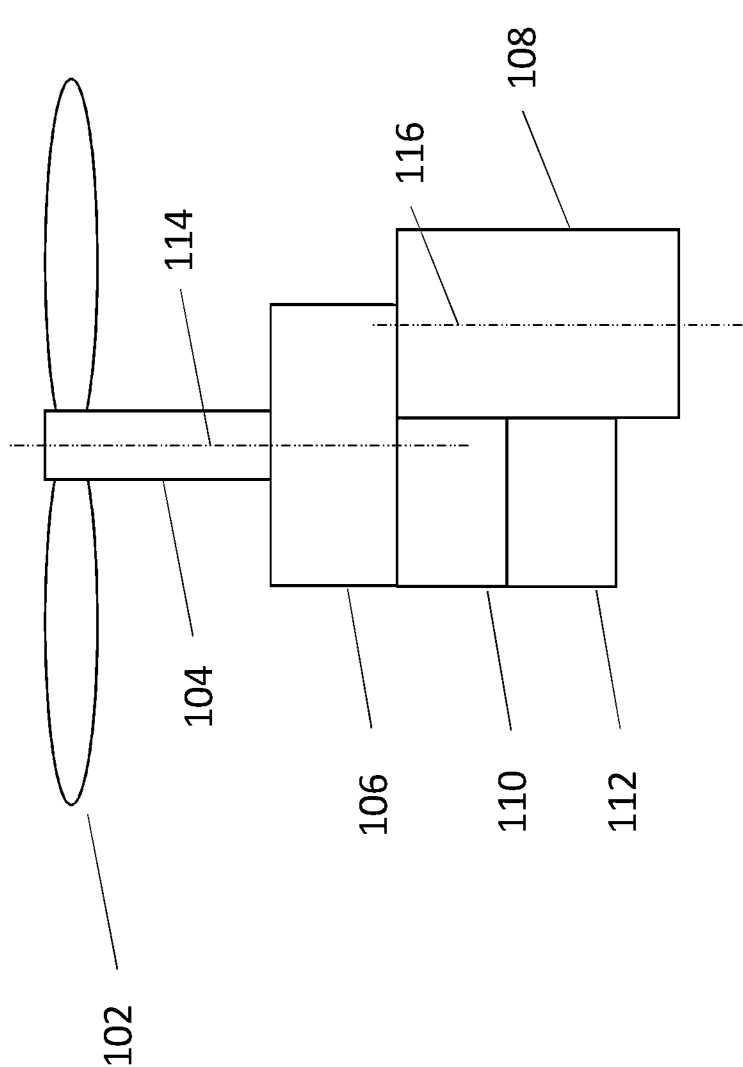

| | | | | |
|---|---|---|---|---|
| 2011/0005849 | A1 | 1/2011 | Stervik et al. | |
| 2017/0240274 | A1 | 8/2017 | Regev | |
| 2021/0094694 | A1* | 4/2021 | Seminel | B64D 27/34 |
| 2022/0119121 | A1 | 4/2022 | Lacaux et al. | |
| 2022/0234744 | A1* | 7/2022 | Botti | B64D 35/023 |
| 2022/0324558 | A1* | 10/2022 | Ross | B64D 27/33 |
| 2023/0017954 | A1* | 1/2023 | Allias | B64D 35/024 |
| 2023/0160357 | A1* | 5/2023 | Tasker | B64D 35/024 415/122.1 |
| 2024/0208663 | A1* | 6/2024 | Weaver | B64D 27/31 |

FOREIGN PATENT DOCUMENTS

| | | | | |
|---|---|---|---|---|
| EP | 385653 | A1 | 9/1990 | |
| EP | 3858653 | A1 * | 8/2021 | B60L 3/0061 |
| WO | 2024077213 | A1 | 4/2024 | |

OTHER PUBLICATIONS

European Patent Office Search Report for Application No. 24213722.2 dated Apr. 11, 2025 (9 pages).

* cited by examiner

AERONAUTICAL PROPULSION SYSTEM

FIELD OF THE INVENTION

The present invention relates to an aeronautical propulsion system, and, in particular the location of a motor power unit within an aeronautical propulsion system. The present invention also relates to a method of manufacturing an aeronautical propulsion system. The invention is particularly suitable for electric propulsion systems for aircraft.

BACKGROUND OF THE INVENTION

In the dynamic world of aviation, the development of advanced technologies is continuously revolutionising aircraft systems, always with the caveat of safety and reliability being equal drivers to higher power density, the latter often being interpreted as compactness. It is these drivers that have seen the replacement of hydraulic and pneumatic aircraft subsystems and is now seeing the emergence of aircraft Electric Power Units (EPUs) as a primary Motive source, hereafter (EMPU). Aircraft EMPUs often comprise; at least one electric motor, usually some gearing, an Electric Control Unit (ECU) or motor power unit, an oil pump for lubrication/cooling and sometimes a cooling heat exchange circuit. The motor power unit may further comprise an inverter/converter and motor control electronics.

While the adoption of EMPUs offers numerous advantages, their implementation also comes with challenges specific to the aviation industry. One crucial challenge is weight reduction, which enhances fuel efficiency and affects payload capacity, particularly pertinent for all-electric aircraft. EPUs in general need to be lightweight and compact, posing a significant integration challenge for complex electrical systems within limited space. Balancing power output, size, and weight, known as power density, becomes a critical aspect of EMPU design.

Strongly associated with EMPU power density is efficient thermal management, often overlooked in favour of compactness, and yet the removal of heat from the various components of the EMPU is critical for EMPUs to prevent overheating and maintain optimal operating conditions. The high-power density and compact nature of EMPUs can lead to excessive heat generation within EMPUs (including the creation of localised ‘hot spots’), which highlights the need for effective prioritised cooling systems and thermal insulation methods to dissipate heat and protect sensitive components.

Because power electronic devices and their supporting active and passive subsidiary devices are usually the most sensitive components within an EMPU to high temperature excursions, which can lead to fatigue and critically reduce their operational life and may even lead to immediate failure, placement of motor control units is an important aspect of realising a safe, high power density EMPU for motive power.

Whilst reducing weight and increasing compactness is an important factor for EMPU design, consideration must also be given to electromagnetic interference (EMI) which is an ever-present challenge for airborne electronics and associated connections. For high power density EMPUs, carrying high, fast-switched currents, electrical components will (radially) generate radiating electromagnetic fields that can self-interfere with the motor power unit and additionally affect avionics systems and communication equipment. Minimising EMI through shielding, ‘grounding’, and isolation techniques is crucial to ensure the safe and reliable operation of EMPUs and other EPUs of critical aircraft systems. Compliance with strict certification and regulatory standards, including EMI testing of finished ‘flight-ready’ units, is necessary to meet aviation authorities’ requirements. This complex certification process adds further challenges to the development and implementation of EMPUs in aircraft. It is an object of the present invention to reduce risk of EMI non-compliance by reducing the reach of radiating fields through optimum placement of EMPU components.

Ensuring the reliability and redundancy of EMPUs is crucial for aviation safety, and though already vital for electric subsystems e.g., air control surfaces where EPUs are widely implemented, reliability takes on a higher level of importance when EPUs are the prime motive/lift source of an aircraft. Implementing a high reliability, fault-tolerant design becomes critical to mitigate the risk of power failures and guarantee continuous operation of the EMPU during emergencies.

To address some of the issues raised above, U.S. Pat. No. 11,560,235, teaches a compact EMPU in which is shown an inverter and control board i.e., a motor power unit surrounded by the motor which it controls and to which the motor power unit supplies power. Whereas this reduces power connection distances to a minimum, it places temperature and EMI sensitive electronics in close connection with strong EMI and heat generating sources.

US20060064998 takes a different approach and teaches mounting of the motor power unit on the side of a cylindrical motor housing. The main benefit derived is thermal separation of the motor power unit from the motor heat source. A close connection is nevertheless enabled, and it is noted in US’998 para 200 that an additional benefit derives from orthogonal electrical connections between motor power unit and the motor “preventing the terminals from being bent or broken due to vibrations of the vehicle chiefly acting thereon in the up-and-down direction.” Whereas mechanical integrity of connections undergoing uni-axial vibration between the motor power unit and motor are helped by this arrangement, US’998 teaches resin back fill of the motor power unit housing 82 with a gel resin to provide overall antivibration properties. Particularly leaded electronic components e.g., large through-hole mounted components are vulnerable to fatigue stress fracture and potential for this is exacerbated when motor power unit leaded components are mounted orthogonal to the main vibration source. Though gel backfill in some instances improves heat conduction from electronic components when compared to natural air convection, this is dependent on the rate of heat generation and in practice resin backfill limits heat removal where ideally heat removal should remain open to improvement through e.g., liquid cooling. Resin backfill effectively limits the rate of heat generation tolerable by the arrangement taught by US’998 and at a level well below that possible by applying liquid coolant heat exchange media. Resin backfill is also a wet process which increases production complexity.

A problem with existing EMPUs is that the motor power unit is generally located, in order to maximise compactness, in an integral manner with other components of the EMPU—for example, the motor. This means that, not only is it difficult to perform maintenance on the motor power unit separately to the rest of the EMPU, but also any commissioning testing (for example, temperature testing) of the EMPU has to be performed on EMPU as a whole whilst it incorporates the motor power unit. This may increase EMPU commissioning test failure rates and also increase the complexity of and time taken by the EMPU commissioning tests.

Finally, in order to minimise the package size of existing EMPUs, and to reduce the distance between the motor power unit and motor, it is common for the motor power unit to be located such that it overlaps with the motor along the motor's rotation axis. A potential disadvantage of such an arrangement is that, should the structure of the motor fail, the rotor may cause energetic debris to be thrown radially outwards where it may collide with the motor power unit, potentially causing the motor power unit to fail and/or catch fire.

In reviewing prior art approaches to addressing these challenges the applicant has appreciated there is a specific need to seek a better solution to placement of the associated electric power supply and control sub-units, sometimes referred to as the 'power controller' or the motor power unit for aircraft EMPUs. It is an object of the present invention to provide a high-power density EMPU that includes robustness of placement of the relatively sensitive motor power unit. Other objects and features of the present invention will become apparent from the following description with reference to the accompanying drawings.

It is another object of the present invention to provide an aeronautical propulsion system that obviates or mitigates one or more disadvantages of the prior art, whether identified herein or elsewhere.

SUMMARY OF THE INVENTION

The present invention is defined by the independent claims appended hereto. Further advantageous embodiments are also defined by the dependent claims, also appended hereto.

According to a first aspect of the invention there is provided an aeronautical propulsion system comprising: a propeller mounted to a propeller shaft defining a propeller axis; an electric motor comprising a motor output shaft defining a motor axis; wherein the motor output shaft and propeller shaft are connected by a linkage such that, in use, driving the motor output shaft for rotation drives rotation of the propeller via the propeller shaft and linkage; and a motor power unit configured to receive power from a power source and provide a motor drive signal to the motor; wherein the motor power unit is spaced along the motor axis from the motor.

In other words the motor power unit may be located relative to the motor such that motor power unit and the motor do not overlap along the motor axis.

Arranging the motor power unit in this way means that should the motor fail in a manner in which debris is thrown radially outwards, such debris will not be thrown into the motor power unit, which could further prevent the motor from operating or potentially lead to fire. In addition, locating the motor power unit in this manner means that the motor power unit is readily separable from the rest of the propulsion system which may have further benefits in terms commissioning testing of the propulsion system and servicing the propulsion system.

The motor power unit may be spaced along the motor axis from the rotor of the motor.

The motor may be an axial flux motor.

The motor output shaft may be oriented relative to the propeller shaft such that the motor axis is non-parallel to the propeller axis.

Whilst the invention is capable of being carried out with any appropriate relative orientation between the motor axis and propeller axis (by using an appropriate linkage), it has been found that a non-parallel relative orientation is particularly well-suited to the invention as it allows more flexibility in locating the heat dissipater radially outboard of the motor but within the thrust air column of the propeller.

The motor output shaft may be oriented relative to the propeller shaft such that the motor axis is generally perpendicular to the propeller axis.

The linkage may include a gearbox and the motor power unit may be mounted next to the gearbox. "Next to" may include abutting, adjoining, bordering or being adjacent to.

According to a second aspect of the invention there is provided an aircraft comprising the propulsion system of the preceding aspect.

The aircraft may be a vertical take-off and landing (VTOL) aircraft.

In particular, the aircraft may be an electric vertical take-off and landing (eVTOL) aircraft. Alternatively, the aircraft may be a conventional take-off and landing (CTOL) aircraft.

According to a third aspect of the invention there is provided a method of manufacturing an aeronautical propulsion system, comprising mounting a propeller on a propeller shaft, the propeller shaft defining a propeller axis; providing an electric motor comprising a motor output shaft, the motor output shaft defining a motor axis; connecting the motor output shaft and propeller shaft by a linkage such that, in use, driving the motor output shaft for rotation drives rotation of the propeller via the propeller shaft and linkage; providing a motor power unit configured receive power from a power source and provide a motor drive signal to the motor; and locating the motor power unit so that it is spaced along the motor axis from the motor.

The method of the third aspect of the invention may additionally comprise the step(s) of providing any of the optional features of the first aspect of the invention.

LIST OF FIGURES

Figure 2:
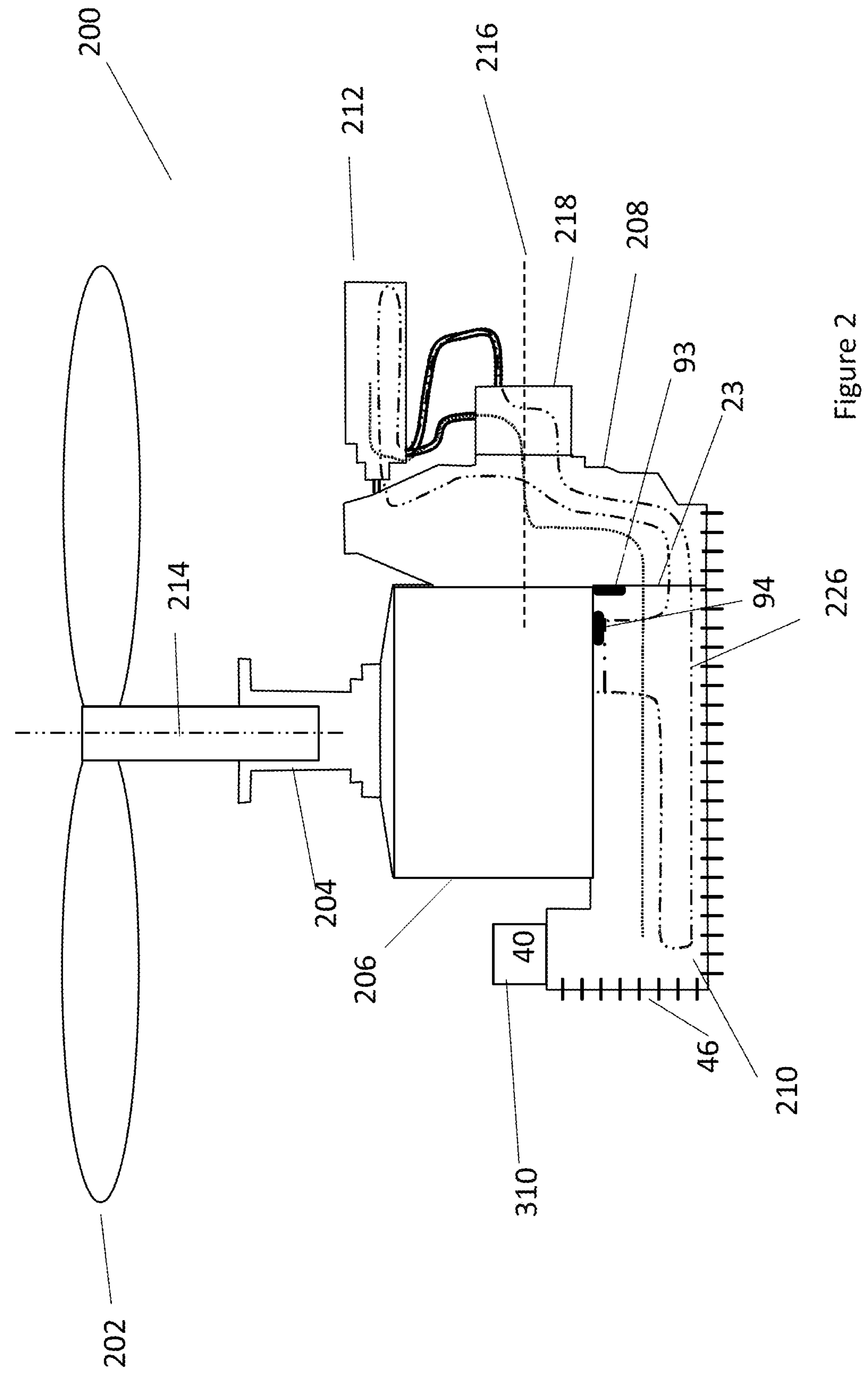

FIG. 1 is a schematic representation of a prior art aeronautical propulsion system; and FIG. 2 shows a schematic view of an aeronautical propulsion system in accordance with an embodiment of the present invention.

DETAILED DESCRIPTION OF THE PREFERRED EMBODIMENTS

FIG. 1 shows a schematic representation of a prior art aeronautical electrical propulsion unit (EPU) system 100. The propulsion system 100 comprises a propeller 102, a propeller shaft 104, a gearbox 106, a radial flux electric motor 108, a motor power unit 110, and a heat exchanger 112. The propeller shaft 104 defines a propeller axis 114 about which the propeller 102 rotates. The propeller 102 and propeller shaft 104 are supported for rotation by gearbox 106.

The motor 108 comprises an output shaft (not shown) which rotates about a motor axis 116. The motor 108 is arranged so that the motor axis 116 extends generally parallel to the propeller axis 114. Such an arrangement may be referred to as a so-called 'in-line' powertrain arrangement. The motor is 108 a so-called 'radial flux' motor. Such radial flux motors have the characteristic of being relatively long in extension along the motor axis 116 due to the manner in which the magnetic fields within the motor are generated. The output shaft of the motor 108 is coupled to an input of the gearbox 106 such that, during use, rotation of the motor 108 is transferred to the propeller 102 via the gearbox 106 and the propeller shaft 104. The gearbox 106 may be any suitable kind of linkage which transmits rotation of the output shaft of the motor to the propeller shaft. However, typically, the gearbox 106 will be a so-called 'step-down' gearbox configured to receive a rotational input from the motor 104 at a relatively high rotational speed and low torque, and provide a rotational output to the propeller shaft 104 at a relatively low rotational speed and high torque.

The motor power unit 110 comprises the power and control electronics required to operate the motor 108. The heat exchanger 112 provides a means to transfer heat produced by the motor 108 to the ambient environment so as to prevent overheating of the motor 108 during use. The motor power unit 110 is positioned axially rearward of the gearbox 106 relative to the propeller axis 114, and the heat exchanger 112 is positioned axially rearward of the motor power unit 110. The above-described layout has traditionally been used to reduce the cross-sectional area of the propulsion system 100 so that it able to be housed within a fuselage (or nacelle drive unit) of an aircraft within which it incorporated. Moreover, the proximity of the motor power unit 110 and the heat exchanger 112 to the motor 108 reduces electrical losses and improves heat transfer.

FIG. 2 shows a schematic view of an embodiment of an aeronautical propulsion system 200 in accordance with an embodiment of the present invention. The propulsion system 200 comprises a propeller 202, a propeller shaft 204, a gearbox 206, an axial flux electric motor 208, a motor power unit 210, a heat exchanger 212 and a coolant pump 218. The propeller 202 is mounted to the propeller shaft 204. The propeller shaft 204 defines a propeller axis 214 about which the propeller 202 rotates.

The propeller 202 and propeller shaft 204 are supported for rotation by gearbox 206. However, in other embodiments, the propeller and propeller shaft may be supported for rotation in any appropriate manner.

The motor 208 comprises a motor output shaft (not shown) that rotates about a motor axis 216. In contrast to the prior art arrangement of FIG. 1, in the propulsion system 200 of the present invention the motor 208 is arranged so that the motor axis 216 extends in a direction that is generally orthogonal to the propeller axis 214. However, in other embodiments, this need not be the case.

In the present embodiment the motor is an axial flux electric motor. However, in other embodiments, any appropriate motor may be used—for example the motor may be non-electrical or may be a radial flux electric motor.

The motor output shaft and propeller shaft 204 are connected by a linkage such that, in use, driving the motor output shaft (not shown) for rotation drives rotation of the propeller 202 via the propeller shaft 204 and linkage.

In the present embodiment the linkage takes the form of a gearbox 206. However, in other embodiments, any appropriate linkage may be used. The output shaft of the motor 208 is coupled to the gearbox 206. The gearbox 206 comprises an orthogonal gear arrangement (not shown) comprising an input gear supported for rotation about the motor axis 216 and an output gear supported for rotation about the propeller shaft axis 214 and enmeshed with the input gear. The input gear is coupled to the motor output shaft, and the output gear is coupled to the propeller shaft 204. The input gear and output gear may be of any suitable design provided that they are able to convert rotational motion about the motor axis 216 into rotational motion about the propeller axis 214. For example, the input gear and/or output gear may be a bevel gear, hypoid gear, worm gear or the like. It will be appreciated that the gearbox 206 may comprise one or more intermediate gears positioned between the input gear and output gear. The gearbox 206 may be any suitable kind of gearbox, however typically the gearbox 206 is preferably a so-called 'step-down' gearbox.

In the present embodiment the aeronautical propulsion system is electrically driven (i.e. the motor is an electrical motor) and, as such, the propulsion system may be referred to as an electrical propulsion unit (EPU) or an electrical motive power unit (EMPU).

The propulsion system 200 comprises a heat exchanger arrangement comprising a heat absorber in thermal communication with a portion of the electric motor and configured to absorb heat produced by the electric motor in use. The heat absorber may, in some embodiments be a separate component, whereas, in others, it may be integral with another portion of the propulsion system. For example, in some embodiments the heat absorber may take the form of a portion of a wall of a motor housing of the motor.

The heat exchanger arrangement also comprises a heat dissipater 212, which may itself be referred to as a heat exchanger. The heat dissipater 212 may take any appropriate form—for example, it may be a radiator with fins and/or coils. Alternatively, the heat dissipater may be integral with another portion of the propulsion system. For example, in some embodiments the heat dissipater may take the form of a portion of a wall of an exterior housing of the propulsion system.

The purpose of the heat dissipater 212 is to dissipate heat into the ambient environment to the exterior of the propulsion system and thereby to cool the motor and, in particular, remove heat generated in the motor during its use.

The heat dissipater 212 is in thermal communication with the heat absorber via a thermal conduit.

The heat dissipater 212 is located, relative to the propeller axis 214, radially outboard of the electric motor 208 (that is to say, the heat dissipater is located at a greater radial distance from the propeller axis as compared to that of the motor 208). In addition, the heat dissipater 212 is located at a radial distance from the propeller axis 214 which is less than the maximum radius of the propeller 202.

In light of the fact that the heat dissipater is located radially outboard of the electric motor and at a radial distance from the propeller axis which is less than the maximum radius of the propeller, the heat dissipater is located in the thrust air column produced by the propeller when the propeller is driven for rotation by the electric motor, and is not shielded from the thrust air column by the electric motor. This maximises the airflow over heat dissipater and therefore increases the effectiveness of the heat exchanger arrangement removing heat from the electric motor during operation. The ability to remove more heat from the motor during operation may also improve the performance of the motor. For example, if the heat exchanger arrangement is capable of removing more heat from the motor, then it may be possible to provide more power to the motor without producing an adverse increase in temperature of the motor.

In the present embodiment the whole of the heat dissipater is located both radially outboard of the electric motor, and at a radial distance from the propeller axis which is less than the maximum radius of the propeller. However, in other embodiments only a portion of the heat dissipater may be located in this manner—the benefits of the invention will still be achieved as compared to known propulsion systems.

As part of the heat exchanger arrangement, the coolant pump 218 and heat dissipater 212 are connected to the motor 208 via coolant lines 226. That is to say, the thermal conduit of the heat exchanger arrangement comprises first and second thermal fluid pipes in the form of coolant lines 226. The thermal fluid pipes in the form of coolant lines are configured to carry thermal fluid between the heat absorber and the heat dissipater.

The pump 218 is configured, in use, to pump thermal fluid i) along the first thermal fluid pipe from the heat absorber to the heat dissipater; and ii) along the second thermal fluid pipe from the heat dissipater to the heat absorber. In this way, under the action of the pump, the coolant lines 226 circulate the coolant (which may be any appropriate type of fluid, but, is preferably a liquid) through the motor 208 and the heat exchanger 212. The coolant receives thermal energy from the motor 208 and dissipates the received thermal energy to the ambient environment via the heat dissipater 212 so as to cool the motor 208 and thereby prevent overheating/enhance performance.

Whilst the thermal conduit in the present example includes pipes which carry a moving thermal fluid so as to transport heat. In other embodiments the thermal conduit may be static such that thermal flow within the heat exchanger arrangement occurs due to conduction of heat through the thermal conduit.

The motor power unit 210 is configured to receive power from a power source (not shown). For example, DC high voltage (DCHV) cables (not shown) may deliver power from a battery arrangement to the motor power unit 210 via a connection port 310. It will be appreciated that any appropriate source of electrical power may be used, as may any appropriate connection port and method of conveying the electric power to the motor power unit.

The motor power unit 210 generates a motor drive signal which is provided to the motor 208. In particular, the motor power unit 210 generates the alternating currents which are provided to the coils (not shown) of the motor to drive the rotor (also not shown) of the motor to rotate. The motor power unit 210 may include power supply and control sub-units. The motor power unit 210 conventionally includes inverter electronics to convert DC power supplied from a power source to AC signals provided to the coils of the motor to drive the motor. The inverter electronics will include suitable switching devices, for example, high-power semiconductor power devices—examples of which include MOSFETs and IGBTs.

The motor power unit typically receives a torque or speed command from the aircraft via a communications bus and uses internal control hardware and software to drive the motor to this demand. The motor power unit may also contain hardware and/or software to monitor the status of itself and/or the electric motor and, optionally, feedback status/health information to the aircraft. The motor power unit may also contain hardware and/or software designed to protect itself and/or the electric motor and/or the aircraft from damage in the case of internal and/or external fault events.

A typical motor power unit will comprise the following components:

1. An input for a high voltage DC power source/supply. The power source usually includes a battery source (which may be the main power supply for the vehicle itself (e.g. a full Electric vehicle) or may itself be charged by an ICE e.g. for a hybrid electric vehicle).
2. One or more inverter(s) to change the DC power source to an AC signal suitable for driving a multiphase (usually 3-phase) traction motor, the inverter comprising power switches and diodes which are controlled by a microcontroller that modulates the DC to generated AC power to provide vectored currents to optimise electric motor power output under different driving conditions. Large capacity and high voltage tolerance capacitor(s) are important components used to smooth power flow from the DC power source into the inverter and conversely back to the battery during generative braking.
3. Inputs for various sensors into the microcontroller (e.g., temperature sensor, current sensor, and voltage sensor, which provide inputs for control; along with driver generated, usually analogue, inputs).

The whole motor power unit when assembled is a complex EMI and heat generating system with high power, and hence bulky, components, which are electrically interconnected via busbars and printed circuit boards. For the purposes of managing inductance some of the components mentioned above are arrayed and closely connected making them power and heat emission dense. Some components are leaded and mounted via electrically conducting 'legs' that make them prone to vibration mechanical fatigue.

The motor power unit 210 is spaced along the motor axis 216 from the motor 208.

In other words the motor power unit 210 is located relative to the motor 208 such that motor power unit 210 and the motor 208 do not overlap along the motor axis 216.

The motor 208 of the EMPU, and, in particular, the rotor (not shown) of the motor represents the highest risk within EMPU of producing energetic flying debris. Arranging the motor power unit in this way means that should the motor fail in a manner in which debris is thrown radially outwards, such debris will not be thrown into the motor power unit, which could further prevent the motor from operating or potentially lead to fire. In addition, locating the motor power unit in this manner means that the motor power unit is readily separable from the rest of the propulsion system which may have further benefits in terms commissioning testing of the propulsion system and servicing the propulsion system.

The motor power unit may be spaced along the motor axis from the rotor of the motor. That is to say, it is preferable that the motor power unit 210 is spaced along the motor axis 216 from the entirety of the motor 208. However, it will be appreciated that, given it is the rotation of the rotor that is likely to cause debris to be thrown radially outwards during motor failure, benefits of the invention will also be achieved provided the motor power unit is spaced along the motor axis from the rotor of the motor.

An object of the present invention is to achieve the highest power density arrangement of EMPU components without compromising reliability and also facilitating straightforward servicing of the EMPU.

Mounting the motor 208 orthogonal to the propeller shaft 204 results in less motor rotation axis 22 vibration excited by the propeller. In addition, arranging the motor 208 orthogonal to the propeller 202 via the gearbox 206 allows optimum cooling from heat exchanger 212, easy access to motor 208 for preventative maintenance, and, crucially, by mounting the motor power unit 210 in an enclosure so that the motor power unit 210 is spaced along the motor axis 216 from the motor 208 (and such that the enclosure for the motor power unit and motor power unit itself are orthogonal to the motor 208), this minimises heat generated by the motor 208 being transferred to the enclosure containing the motor power unit, and hence the motor power unit itself. Components of the motor power unit can be particularly sensitive to thermal variations, so minimising heat transfer to the motor power unit is of notable benefit.

Furthermore, by mounting the motor output shaft and propeller shaft 204 so that they are non-parallel, and by mounting the motor power unit 210 in an enclosure so that the motor power unit 210 is spaced along the motor axis 216 from the motor 208, this minimises the zone of contact (shown by interface wall 23) between the motor 208 and enclosure housing the motor power unit 210 and yet enables coolant connection (via coolant lines 226) between the motor 208 and enclosure housing the motor power unit 210 through the interface wall 23.

Components of the motor power unit 210, particularly leaded devices and large surface mount components are not robust to vibration, and in many instances, exemplified by the teaching of US20060064998, these devices are protected through use of vibration dampening measures sometimes combined with moisture protection, usually through use of a soft resin backfill, to increase component resilience to fatigue fracture. Because of sensitivity to vibration induced fatigue fracture of leaded component legs and solder joints in general, the best place to mount the motor power unit enclosure (and hence motor power unit 210) is as close as possible to the propeller 202, which is the largest source of aggravating vibration. Contrary to what might be expected, this is because vibration amplitude is often amplified by distance from the driving source. In arrangements in which motor output shaft and propeller shaft 204 are non-parallel (e.g. orthogonal), mounting the motor power unit 210 so that it is spaced along the motor axis 216 from the motor 208 allows the motor power unit 210 to be located closer to the propeller 202/propeller axis 214.

With reference to FIG. 2, the motor power unit 210, though shown in close proximity to the motor 208, and sharing internal walls 23 between the motor 208 and the motor power unit 210, is not integrated into the motor 208 or gearbox 206. In particular, the motor power unit is removably housed in the motor power unit enclosure. The motor power unit enclosure preferably includes an openable cover. When the cover is open, the motor power unit can be inserted into or removed from the enclosure. When the cover is closed the motor power unit cannot be inserted into or removed from the enclosure. The cover prevents ingress of material into the enclosure, therefore ensuring that, when located in the enclosure, with the cover closed, the motor power unit is not exposed to potential contaminants in the environment outside of the enclosure. The enclosure may include any appropriate connector to connect the motor power unit to a power source, control electronics and the motor. Whilst the motor power unit enclosure has been described with reference to the present embodiment of EMPU, it will be appreciated that the enclosure may form part of any appropriate EMPU arrangement where the motor power enclosure is connected to or integral with the motor housing.

The ability to separate the motor power unit 210 from the rest of the EMPU (e.g. because the motor power unit is removably housed in the motor power unit enclosure) obviates the requirement for the EMPU to be tested with the motor power unit integrated into the EMPU as a single unit. Thermal and vibration testing (sometimes known as 'shake and bake' testing) is sometimes used to screen out units that have 'early life failure' issues. It may be more cost effective to test the motor power unit and remainder of the EMPU separately for several reasons including:

- not having to rework a complete EMPU due to a test failure relating only to the motor power unit,
- faster thermal cycling (and thus lower overall testing durations) for testing the motor power unit separately due to not having to heat and cool the whole EMPU mass (i.e. it is only necessary to heat and cool the motor control unit when testing the motor control unit),
- lower mass to shake (for vibration testing) when testing only the controller, rather than the whole EMPU.

These considerations maintain a compactness of design and are advantageous for commercial uptake, providing a cost effective and optimised EMPU layout, suited to high volume production.

With reference to FIG. 2, the placement of the motor power unit 210 (and motor power unit enclosure) in the arrangement of components that together make EMPU 200, is beneficial to reducing swap-out time for motor power unit 210 maintenance. It is often the case that, despite reducing thermal, thermal induced mechanical and mechanical stresses for motor power unit 210 electronics, it is, nevertheless, the relatively low cost electronics components or sub-assemblies which are frequently the life-limiting parts of the system. It follows that, should the motor power unit fail, there is commercial value in not having to remove a complete EMPU for want of replacing a failed motor power unit (i.e. a relatively low cost electronic device which may include a PCB daughter board etc., which has failed).

A common design driver of machines and electronics is towards smaller volume often associated with more complexity. Placing the motor power unit 210 below the propeller 202 and gearbox 206 with motor 208, preferably axial flux, mounted orthogonally to the propeller 202 and propeller shaft 204, leads to a shorter EMPU package, when measured along the propeller axis 214. Though further reduction in EMPU volume and increased compactness could be achieved by full integration of the motor power unit 210 into the housing of the motor, this would compromise maintenance, testing and several other factors already discussed. Advantageously, the present invention as shown schematically in FIG. 2, is compact, and consequently the same EMPU format is compatible in different vehicle configurations. For example, the EMPU may form part of an aircraft, such as an electrically powered aircraft and/or a vertical take-off and landing (VTOL) aircraft.

With reference to FIG. 2, because of the proximity of the motor power unit 210 to the motor 208, AC high voltage (ACHV) power and sensor cables (not shown) for driving motor 208 (and which link the motor power unit 210 and motor 208) can be short, reducing the potential for emission of and susceptibility to electromagnetic interference (EMI) without the need for motor power unit 210 to be integrated into or around the motor 208.

Again, with reference to FIG. 2, advantageously, DC high voltage (DCHV) cables (not shown) delivering power to the motor power unit 210 from a power source, such as a battery, are connected to the motor power unit through a connection port 310 which is, with reference to the confines of the EMPU, furthest away from high voltages occurring during motor 208 operation. This routing of DCHV cables away from motor 208 is beneficial in reducing potential gradients that would otherwise occur if these cables passed close to ACHV motor power cables (not shown). It will be appreciated that any type of connection port suitable for connecting DCHV power supply cables to the motor power unit 210 may be used.

Still with reference to FIG. 2, the motor power unit 210 is supplied with dual redundant cooling circuits 226. The heat generated within EMPU components is greatest in the motor 208 followed by the motor power unit 210. This same sequence is seen in terms of propensity of subcomponents to suffer failure due to over-temperature excursions.

Again, with reference to FIG. 2, the motor power unit 210/controller can advantageously be provided with heat exchange surface features 46 to assist removal of heat through forced convection and conduction into the thrust air flow column.

Still with reference to FIG. 2, the positioning of EMPU components maximises the number of shared enclosure surfaces. This arrangement allows a single monolithic internal interface surface forming open containers/enclosures housing gearbox 206, motor power unit 210 and motor 208. A single internal interface reduces thermal resistance between components and eases coolant fluid flow between components. Leaks between component cavities/enclosures are not generally troublesome and shared interfaces become potential cold plate cooling surfaces (not shown).

With the motor power unit 210 sited in line with propeller 202 (e.g. the propeller axis 214) and adjacent to the motor 208 there occur several additional advantages over those already described.

The position of the motor power unit 210 enables integration of motor position and/or speed sensors 93 and propeller speed and/or bearing vibration sensors 94 into the motor power unit 210. Sensors 93 and 94 may be integrated with the motor power unit 210 and/or housed within the motor power unit enclosure keeping wiring looms (between the motor power unit and sensors) short, reducing risk of EMI.

With reference to FIG. 2 there is shown a schematic representation of coolant pump 218 mounted to motor 208 and fluid to air heat exchanger 212 positioned in and abundant air flow of the thrust airflow column produced by the propeller 202 in use.

It may be seen in FIG. 2 that all components of EMPU are arranged so as to maximise cooling opportunities i.e., by exposing component surfaces (or rather the surfaces of the housings of the components) to air flow which may be advantageous because of position of the surfaces within the thrust air flow column of the propeller or air flow may be easily directed by way of simple ducting (not shown). For those with reasonable skill in the art it will be understood all EMPU surfaces exposed to air may be enhanced in terms of heat exchange, through use of fins and similar features.

In embodiments of the invention in which the motor is an axial flux motor, given their relatively short axial length (as compared to a traditional radial flux motor), the motor can be more readily mounted orthogonally (e.g. via a gearbox) to a mechanical load, in this case a propeller. Such an arrangement leaves space for the motor power unit to be placed directly under the gearbox (i.e. such that the gearbox is spatially between the propeller and the motor power unit, or, put another way, the propeller is spatially on the opposite side of the gearbox to the motor power unit) and alongside the motor.

This differs from known arrangements because usually there is preference for placing the motor power unit in a 'quiet' region, away from sources of heat and vibration, given the susceptibility of the electrical components of the motor power unit to temperature variation and vibration. In contrast, the present invention enables placement of the motor power unit closer than usual to the mechanical load. There is an advantage in this placement—the shorter distance between the motor power unit and the main vibration source (i.e. the propeller) results in less mechanical amplification of vibration caused by the propeller before it reaches the motor power unit.

In some embodiments of the invention the motor power unit can located directly adjacent the gearbox—this is because a heat exchanger arrangement that removes heat from the motor power unit will consequently remove heat from the gearbox (or vice versa)—this enables the motor power unit to be located close to the propeller, thus reducing the size of the EMPU whilst enabling the EMPU to still function in an acceptable manner.

It will be appreciated by the person skilled in the art that many modifications to the above described propulsion system are possible without departing from the scope of the present invention as set out in the following claims.

The invention claimed is:

1. A fully-electric aeronautical propulsion system (200), comprising:

a propeller (202) mounted to a propeller shaft (204) defining a propeller axis (214);

an electric motor (208) comprising a motor output shaft defining a motor axis (216); wherein the motor output shaft and propeller shaft are connected by a linkage such that, in use, driving the motor output shaft for rotation drives rotation of the propeller via the propeller shaft and linkage; and a motor power unit configured to receive power from a power source and provide a motor drive signal to the motor;

wherein the motor power unit is spaced along the motor axis from the motor;

wherein the motor output shaft is oriented relative to the propeller shaft (204) such that the motor axis (216) is non-parallel to the propeller axis (214); and wherein the motor power unit is removably housed in a motor power unit enclosure.

2. The fully-electric aeronautical propulsion system (200) according to claim 1, wherein the motor (208) is an axial flux motor.

3. The fully-electric aeronautical propulsion system (200) of claim 1 wherein the linkage includes a gearbox and wherein the motor power unit is mounted next to the gearbox.

4. An aircraft comprising the fully-electric aeronautical propulsion system (200) of claim 1.

5. An aircraft according to claim 4, wherein the aircraft is a vertical take-off and landing (VTOL) aircraft.

6. The fully-electric aeronautical propulsion system according to claim 1, wherein the motor unit is separated from the motor by an interface wall of the motor power unit enclosure.

7. The fully-electric aeronautical propulsion system according to claim 1, further comprising a heat dissipater, wherein the heat dissipater is located, relative to the propeller axis, radially outboard of the electric motor.

* * * * *